Figure 1:
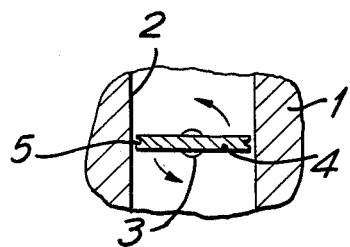

United States Patent [19]

Vogler et al.

[11] Patent Number: 4,572,478

[45] Date of Patent: Feb. 25, 1986

[54] THROTTLE-VALVE CONNECTION PIECE

[75] Inventors: Hans-Ulrich Vogler, Frankfurt am Main; Gerhard Ruschek, Hattersheim; Horst Schlick, Schwalbach, all of Fed. Rep. of Germany

[73] Assignee: VDO Adolf Schindling AG, Frankfurt am Main, Fed. Rep. of Germany

[21] Appl. No.: 555,859

[22] Filed: Nov. 28, 1983

[30] Foreign Application Priority Data

Nov. 29, 1982 [DE] Fed. Rep. of Germany ....... 3244103

[51] Int. Cl.<sup>4</sup> ............................................. F16K 1/226
[52] U.S. Cl. .................... 251/305; 137/513.5
[58] Field of Search .............. 251/305, 306, 117; 137/513.3, 513.5

[56] References Cited

U.S. PATENT DOCUMENTS

| 813,771 | 2/1906 | Bush | 251/306 |
| 2,946,554 | 7/1960 | Asker et al. | 251/306 |
| 3,809,361 | 5/1974 | Pfundstein et al. | 251/305 |
| 3,941,151 | 3/1976 | Biddle | 251/306 |

FOREIGN PATENT DOCUMENTS

| 2210177 | 9/1973 | Fed. Rep. of Germany | 251/305 |
| 2706531 | 8/1977 | Fed. Rep. of Germany | 251/305 |
| 1475847 | 2/1967 | France | 251/305 |
| 2234497 | 1/1975 | France | 251/305 |
| 881436 | 11/1961 | United Kingdom | 251/305 |

OTHER PUBLICATIONS

IBM Technical Disclosure Bulletin, vol. 10, No. 12, May 1968, p. 1988.

Primary Examiner—Martin P. Schwadron
Assistant Examiner—John C. Fox
Attorney, Agent, or Firm—Martin A. Farber

[57] ABSTRACT

A throttle valve 4 is pivotally mounted about a shaft 3 within a connection-piece housing of a throttle-valve connection piece. In order to reduce the air leakage rate, means are provided for eddying the leakage air which, when the throttle valve is closed, passes between it and the wall of the bore of the connection-piece housing. The connection-piece housing preferably has two bores which open into each other forming a crescent-shaped step, against which the throttle valve rests in the closed position and a reduction in cross section on one side in the bore of the connection-piece housing is provided by an arcuate transition to the bore of smaller diameter and the crescent-shaped step is located on the opposite side.

3 Claims, 4 Drawing Figures

THROTTLE-VALVE CONNECTION PIECE

The invention relates to a throttle-valve connection piece having a throttle valve which is arranged swingable within a bore of a connection-piece housing. Such a throttle-valve connection piece is seated, for instance, on the carburetor of a spark ignition engine in order to be able, by swinging the throttle valve, to regulate the air drawn in by the engine.

In throttle-valve connection pieces of this type the problem arises that, on the one hand, the throttle valve, when closed, should close-off the uncovered cross-section as far as possible but must in no case jam in its closed position. The throttle-valve connection piece together with the throttle valve is therefore manufactured with a very high degree of precision, and an adjustable stop is provided for the actuating lever of the throttle valve in order to set the closed position. In this way, it can be seen to it by readjustment that, in its closed position, the throttle valve arrives at a plane which is inclined about 4° to the transverse plane of the throttle-valve connection piece, in which plane it will still not jam but will substantially close-off the cross-section. Despite this, the leakage-air rates of throttle-valve connection pieces for carburetors of spark-ignition engines of automotive vehicles are about 5 kg/hour and therefore still undesirably high.

The object of the present invention is to develop a throttle-valve connection piece of the afore-mentioned type with which the greatest possible sealing of the throttle valve is obtained in its closed position without undesirably high precision in manufacture and without time-consuming readjustment.

SUMMARY OF THE INVENTION

This object is achieved, in accordance with the invention, by means for eddying the leakage air which passes between the throttle valve and the wall of the throttle bore when the valve is closed.

A reduction in cross section for flattening of the angle-of-rotation vs. air-mass characteristic curve can be obtained in a particularly simple manner by the features that the reduction in cross section on one side in the bore (9) of the connection-piece housing (1) is provided by an arcuate transition (11) to a bore (9) of smaller diameter and a crescent-shaped step (7) is located on the opposite side.

This solution pursuant to the invention represents a reversal of the previous principles of design for providing a throttle valve which closes as tightly as possible. Due to the invention, a high degree of sealing is obtained by eddying the flow of leakage air in the air gap rather than by closer and closer tolerances and readjustment. The throttle-valve connection piece of the invention provides sealing in accordance with principles comparable to that of a labyrinth sealing. It can therefore have a relatively large air gap without undesirably high leakageair rates occurring. As a result, it is possible to dispense with an adjustable stop for establishing the closed position; rather, a fixed, non-adjustable stop can be provided. Such a non-adjustable stop also makes it possible to provide in advance the vacuum control bore which is required in some throttle-valve connection pieces, while in the case of throttle-valve connection pieces with an adjustable stop, such a control bore could be drilled only after the adjustment of the closed position of the throttle valve, which naturally resulted in considerable manufacturing expenses.

One particularly simple means of eddying the leakageair consists of a circumferential groove provided in the cylindrical surface of the throttle valve.

If a resilient ring, formed in manner similar to a piston ring, is inserted into the groove, the passage of leakage air can be completely prevented.

Another advantageous development of the invention consists in providing, within the housing of the throttle-valve connection piece, by a continuous bore and a bore offset thereto which opens into the continuous bore at the level of the throttle valve, the crescent-shaped step against which the throttle valve rests in its closed position. The eddying of the flow of leakage air takes place on one side of the throttle valve between the throttle valve and the crescent-shaped step. On the other side of the throttle valve one can either dispense with such eddying means or provide, for instance, the circumferential groove arranged in the cylindrical surface of the throttle valve. This groove can of course also be located at the place where the step is, which has advantages from a manufacturing standpoint and contributes to a further reduction in the leakage-air rate.

The crescent-shaped step is capable of replacing the adjustable stop for the actuating lever, so that the throttle-valve connection piece as a whole can be manufactured more economically than the known throttle-valve connection piece. Another advantage of this embodiment is that the position of the vacuum control bore is determined by the crescent-shaped step, so that it need not be drilled only after installation of the throttle valve but can be provided in advance.

A further reduction in the leakage-air rates is assured by the features that by means of two offset arranged non-continuous bores which open into each other at the level of the throttle valve within the connection-piece housing (1), two opposing crescent-shaped steps (7, 10) are provided which face in opposite directions and against which the throttle valve (4) simultaneously rests in its closed position.

Furthermore in accordance with the invention the inner wall of the bore (9) of the connection-piece housing (1), within the region of the throttle valve (4) on at least one side of the throttle valve (4), may have a reduction in cross-section (arcuate transition 11) towards the surface of rotation of the throttle valve (4).

By these features, the progression of the characteristic curve of the angle-of-rotation plotted against the mass of air flow through the throttle-valve connection piece can be increased so that during the initial degrees of the angle of opening of the throttle valve the uncovered cross section increases more slowly than in the case of an ordinary throttle valve. As a result, the uncovered cross section can be more precisely established in this initial region. Furthermore, control devices which operate in this vicinity (for example speed-control devices, idle-speed controllers) can function more effectively. The features in accordance with the invention for obtaining this progression are simpler and thus cheaper to carry out than the measures previously known for this purpose, namely the provision of an expensive lever mechanism which acts on the actuating lever of the throttle valve.

The leakage-air flow can be prevented almost completely if, in accordance with another embodiment of the invention, an elastic bearing surface is arranged on each of the crescent-shaped step or respectively the crescent-shaped steps.

The invention permits of numerous possible embodiments. Four thereof are illustrated in the drawing and are described in the following.

The drawing shows in four Figures each a longitudinal section through a region, with which the invention is concerned, of an embodiment of a throttle-valve connection piece.

In the individual figures, functionally identical parts have been provided with the same reference numbers.

FIG. 1 shows a connecting-piece housing 1 of a throttle-valve connection piece which has a continuous cylindrical bore 2. Within this bore, a throttle valve 4 is arranged for swinging around a horizontal shaft 3, the valve having a circular cross-section in exactly the same manner as the bore 2. In the cylndrical surface of the throttle valve 4 there is provided a circumferential groove 5. This groove is of rectangular cross-section and has the result that leakage which passes between the wall of the bore 2 and the throttle valve 4 can expand therein before it must again be compressed in order finally to pass through the throttle valve 4. In this way, eddying is produced, by which the leakage-air rate is considerably reduced as compared with an ordinary throttle valve 4 having a smooth cylindrical surface.

It may be pointed out that the throttle-valve connection piece is customarily made as an aluminum die-casting and the bore 2 need not be produced literally by boring.

It is not shown in the drawing that a resilient ring which is developed similar to a piston ring may be inserted in the circumferential groove 5, by which the throttle valve 4 is completely sealed off in its closed position.

Figure 2:
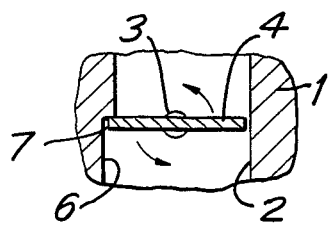

FIG. 2 again shows the connection-piece housing 1 with the throttle valve 4 swingable around the shaft 3. Within the connection-piece housing 1, a continuous bore 2 is provided in exactly the same manner as in the case of the embodiment shown in FIG. 1. Seen from below in the drawing, a bore 6 of the same diameter is provided up to the level of the throttle valve 4, this bore being slightly offset from the bore 2, so that a crescent-shaped, downward-facing step 7 is produced, against which the throttle valve 4 rests in a closed position.

Figure 3:
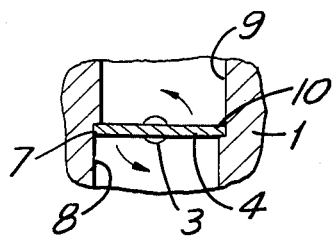

In the embodiment shown in FIG. 3, two bores 8, 9 of the same diameter are offset laterally with respect to each other within the connection-piece housing, opening into each another at the level of the throttle valve 4. In this way, in addition to the crescent-shaped step 7, an upward-facing crescent-shaped step 10 is produced on the opposite side.

In its closed position, the throttle valve 4 rests both against the crescent-shaped step 7 and against the crescent-shaped step 10. It has not been shown in the drawing that both an elastic covering can be provided on the crescent-shaped step 7 of FIG. 2 or 3 as well as on the crescent-shaped step 10, whereby the sealing of the throttle valve 4 in the closed position is still further improved.

Figure 4:
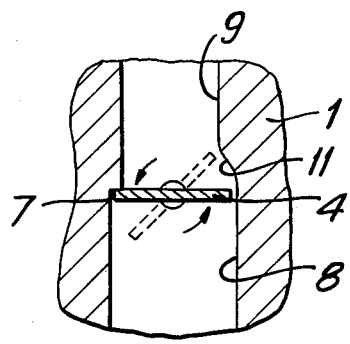

FIG. 4 again shows the connection-piece housing 1 with two bores 8, 9 offset with respect to each other, so that a crescent-shaped step 7 is produced. The bore 9 is, however, smaller in cross-section than the bore 8. On the side opposite the crescent-shaped step 7 there is an arcuate transition 11 which extends in a shape corresponding to the surface of rotation of the throttle valve 4. The result of this shape is that upon a slight swing of the throttle-valve 4 scarcely any cross-section is opened up on the right-hand side of the connection-piece housing 1, as seen in the drawing, while the throttle valve opens in normal manner on the left-hand side, as seen in the drawing. The arcuate transition may be of different shapes depending on what opening characteristic is desired. It is also conceivable to provide a corresponding arcuate transition below the throttle valve on the left-hand side, as seen in the drawing.

We claim:

1. A throttle valve connection piece with a throttle valve pivotally mounted in a passage of the connection piece, comprising a connection piece housing having an inner wall forming a bore as said passage, said throttle valve being pivotally mounted in said housing in said bore and having a closed position leaving a gap between said wall and an edge of said throttle valve with leakage air passing in the gap between the throttle valve and a portion of the wall of the bore when the throttle valve is in the closed position, means for eddying said leakage air which passes in said gap between the throttle valve and said portion of the wall of the bore when the throttle valve is in the closed position, said bore of said housing comprises a first bore and a second bore having a smaller diameter than said first bore and opening into said first bore at a level of said throttle valve in said closed position forming thereat a crescent-shaped step within said connection piece housing on one side of said bore of said housing, said eddying means further includes said crescent-shaped step, and said wall on another side of said bore of said housing opposite said one side is formed with a reduction in cross-section comprising an arcuate transition to said second bore.

2. The throttle valve connection piece as set forth in claim 1, wherein said arcuate transition has a shape different from the generated surface of rotation of said throttle valve.

3. The throttle valve connection piece as set forth in claim 1, wherein said arcuate transition corresponds to a generated surface of rotation of said throttle valve.

* * * * *